V. A. FYNN.
POLYPHASE COMMUTATOR MOTOR.
APPLICATION FILED JUNE 1, 1909.
960,882.
Patented June 7, 1910.
2 SHEETS—SHEET 1.
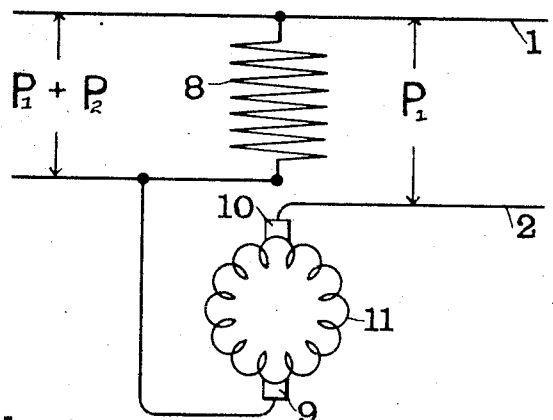
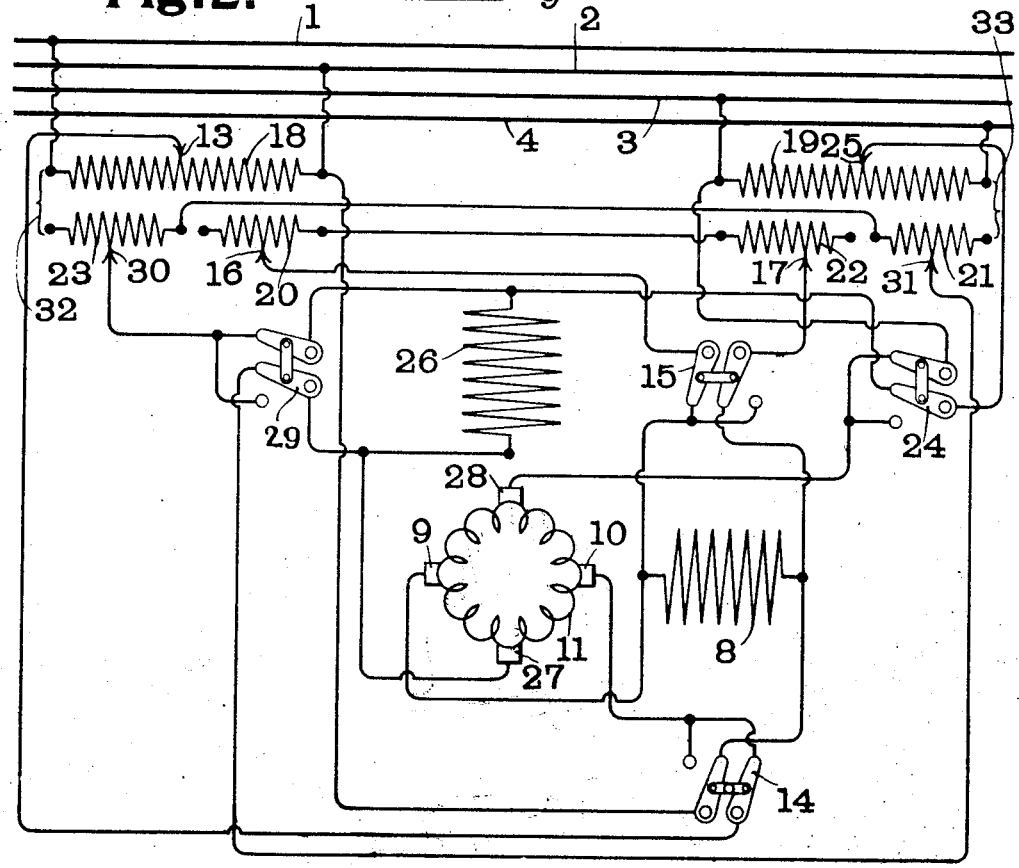
Witnesses
L. L. Mead.
W. H. Alexander
Inventor
Valére A. Fynn
By his Attorneys
Fowler & Huffman V. A. FYNN.
POLYPHASE COMMUTATOR MOTOR.
APPLICATION FILED JUNE 1, 1909.
960,882.
Patented June 7, 1910.
2 SHEETS—SHEET 2.
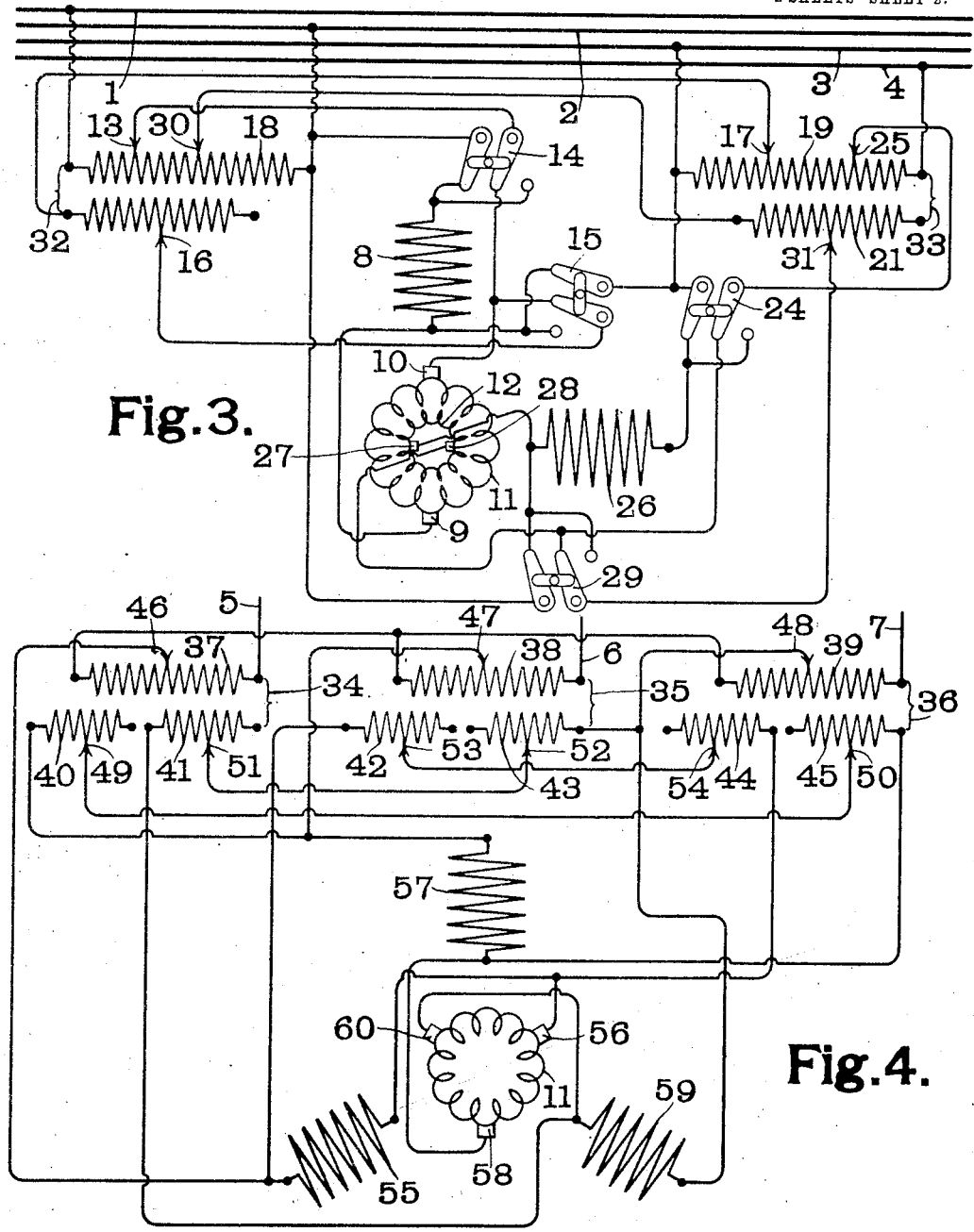
Witnesses
L. L. Mead.
W. H. Alexander.
Inventor
Valère A. Fynn
By his Attorneys
Fowler & Huffman

UNITED STATES PATENT OFFICE.

VALÈRE ALFRED FYNN, OF LONDON, ENGLAND.

POLYPHASE COMMUTATOR-MOTOR.

960,882.  Specification of Letters Patent.  Patented June 7, 1910.

Application filed June 1, 1909. Serial No. 499,464.

*To all whom it may concern:*

Be it known that I, VALÈRE ALFRED FYNN, a subject of the King of England, residing at London, England, have invented a certain new and useful Polyphase Commutator-Motor, of which the following is such a full, clear, and exact description as will enable any one skilled in the art to which it appertains to make and use the same, reference being had to the accompanying drawings, forming part of this specification.

My invention relates to polyphase commutator motors of the neutralized conduction type with a shunt characteristic.

It is the object of my invention to simplify the construction of these motors and to provide means for regulating their speed and controlling or improving their power factor.

In the known motors of this type the stator carries an exciting and a neutralizing winding for each phase and this winding is connected in series relation with the rotor along an axis coinciding with that of the neutralizing winding. The term "neutralizing winding", of course, implies that said winding is so connected that its ampere turns oppose the rotor ampere turns in the axis of said winding and thus neutralize them to any desired extent. Now according to this invention I dispense with all the usual additional windings on the stator and utilize each neutralizing winding in at least two ways, firstly as a true neutralizing winding and secondly as a field and I can also use it as a phase compensating winding. Thus each phase of my motor comprises nothing but a working circuit consisting of a working winding disposed on the rotor and of a neutralizing winding disposed on the stator; the two windings are connected in series relation across one phase of the supply. Simultaneously another E. M. F. is impressed on one part only of this working circuit preferably on the neutralizing winding; this other E. M. F. must differ in phase from that impressed on the whole working circuit and may be derived from one or more of the phases of the supply. Any of the E. M. F.'s impressed on any part of the working circuit can be derived from the mains directly or by way of transformers. With this arrangement I am able to vary the speed when desired; also to control the power factor of my motor within the widest limits and in a most economical manner. The rotor may carry more than one commuted winding and those may be connected to independent commutators or not.

In the accompanying diagrammatic drawings, which show two-pole embodiments of my invention, Figure 1 is not an operative combination but simply illustrates the leading idea underlying the invention and as applied to one motor phase only. Fig. 2 is a two-phase motor with phase compensation and adapted for speed regulation; Fig. 3 is a modification of Fig. 2 showing two rotor windings, and Fig. 4 shows the invention as applied to a three-phase machine.

Referring to Fig. 1, the E. M. F. $P_1$ derived from the mains 1, 2 is impressed on the whole of the working circuit. The latter consists of the neutralizing winding 8 and the commuted winding 11. The two are here connected directly in series by way of the brushes 9, 10. If speed regulation only is aimed at then an E. M. F. of same phase as $P_1$ must be independently impressed on part only of the said working circuit, for instance on 8, but if both speed regulation and phase compensating are to be achieved then I impress on part only of the said working circuit an E. M. F. differing in phase from $P_1$. This E. M. F. is here designated by $P_1+P_2$ and is impressed on 8 only. It can be derived from one or more phases of the supply differing from the phase 1, 2 or it can be derived from the phase 1, 2 and from another phase of the supply. The speed is varied by varying the magnitude of the E. M. F. $P_1$ impressed on the whole working circuit relatively to the E. M. F. $P_1$ impressed on part only of that circuit and the power factor is controlled by varying the magnitude of $P_2$ in $P_1+P_2$.

In Fig. 2 the two-phase operative combination consists of two transformers 32, 33 each having one primary 18 and 19, connected to the mains 1, 2 and 3, 4 respectively and each having two secondaries 23, 20 and 22, 31. The combination further comprises the reversing switches 14, 24 and 15, 29 by means of which the direction of rotation may be varied, the motor itself being provided with the commuted winding 11, two sets of working brushes 9, 10 and 27, 28 and two neutralizing windings 8 and 26. The speed and power factor are controlled in the manner already set forth in Fig. 1. One working circuit comprises 8 and the commuted winding 11 along the axis of 8 by way of the brushes 9, 10; one E. M. F. is impressed on the whole of this working circuit and it is derived from the primary 18 of 32 and can be regulated at 13 and reversed at 14. The neutralizing winding 8 has also another E. M. F. impressed upon it which differs in phase from that derived from 18. This other E. M. F. is derived from the secondary 20 of 32 and the secondary 22 of 33 and it can be regulated at 16 and 17 and can be reversed at 15. The other working circuit comprises the neutralizing winding 26 and the commuted winding 11 along the axis of 26 by way of the brushes 27, 28. One E. M. F. is impressed on the whole of this working circuit and it is derived from the primary 19 of 33 and can be regulated at 25 and reversed at 24. The neutralizing winding 26 has also another E. M. F. impressed upon it which differs in phase from that derived from 19. This other E. M. F. is derived from the secondary 21 of 33 and the secondary 23 of 32. It can be regulated at 31 and 30 and reversed at 29.

In Fig. 3 is shown a modification of Fig. 2, there being two commuted windings 11 and 12 on the rotor, each connected to an independent commutator, furthermore the transformers only have one secondary each and the E. M. F. impressed on part only of each working circuit is here applied to the working instead of the neutralizing winding, otherwise the arrangement is the same and will be readily understood since the same parts are similarly numbered in both figures.

The operative combination shown in Fig. 4 illustrates a three-phase motor and comprises three transformers 34, 35, 36 star connected to the mains 5, 6, 7 and each provided with two secondaries 40, 41 also 42, 43 and 44, 45, and a motor having a commuted winding 11 on the rotor, three sets of brushes 56, 58, 60 and three neutralizing windings 55, 57, 59. No reversing switches are shown although such may be made use of in some such manner as indicated in Figs. 2 and 3. The motor being star connected the three working circuits have their neutral point in 11. One of these working circuits consists of the neutralizing winding 55 connected in series and in opposition with 11 by way of brush 56. An E. M. F. derived from 37 and which can be regulated at 46 is impressed on the whole of this working circuit. Another E. M. F. derived in this case from the secondaries 42 and 44 of the transformers 35 and 36 is impressed on 55 only. This other E. M. F. differs in phase from that derived from 34 and can be regulated at 53 and 54. It is apparent from Fig. 4 that the other two working circuits are connected in a corresponding manner.

Having fully described my invention, what I claim as new and desire to secure by Letters Patent of the United States is:

1. In a polyphase motor, at least two working circuits each connected to one phase of the supply and containing a neutralizing winding on the stationary member and a commuted winding on the revolving member, said windings being coaxially connected in series relation, and means for impressing a second E. M. F. on a part only of each working circuit.

2. In a polyphase motor, at least two working circuits each connected to one phase of the supply and containing a neutralizing winding on the stationary member and a commuted winding on the revolving member, said windings being coaxially connected in series relation, and means for impressing a second E. M. F. on each neutralizing winding.

3. In a polyphase motor, at least two working circuits each connected to one phase of the supply and containing a neutralizing winding on the stationary member and a commuted winding on the revolving member, said windings being coaxially connected in series relation, and a transformer for each working circuit for impressing a second E. M. F. on a part only of said circuit.

4. In a polyphase motor, a working circuit for each phase connected to the source of supply and containing a neutralizing winding on the stationary member and a commuted winding on the revolving member, said windings being coaxially connected in series relation and in opposition to each other, means for impressing a second E. M. F. on a part only of the working circuit, and means for varying the phase of said second E. M. F.

5. In a polyphase motor, a working circuit for each phase connected to the source of supply and containing a neutralizing winding on the stationary member and a commuted winding on the revolving member, said windings being coaxially connected in series relation and in opposition to each other, means for impressing a second E. M. F. on a part only of the working circuit, and means for impressing a third E. M. F. on a part only of the working circuit.

6. In a polyphase motor, a working circuit for each phase connected to the source of supply and containing a neutralizing winding on the stationary member and a commuted winding on the revolving member, said windings being coaxially connected in series relation and in opposition to each other, means for impressing a second E. M. F.

on a part only of the working circuit, means for adjusting the magnitude of said second E. M. F., means for impressing a third E. M. F. on a part only of the working winding, and means for adjusting the magnitude of said third E. M. F.

In testimony whereof I have hereunto set my hand and affixed my seal in the presence of the two subscribing witnesses.

VALÈRE ALFRED FYNN. [L. S.]

Witnesses:
   ELIZABETH BAILEY,
   E. E. HUFFMAN.